United States Patent [19]
Yuen et al.

[11] Patent Number: 6,125,231
[45] Date of Patent: Sep. 26, 2000

[54] METHOD OF ADDING TITLES TO A DIRECTORY OF TELEVISION PROGRAMS RECORDED ON A VIDEO TAPE

[75] Inventors: Henry C. Yuen, Redondo Beach; Daniel S. Kwoh, La Canada/Flintridge; Roy J. Mankovitz, Encino; Carl Hindman; Hing Y. Ngai, both of Rancho Palos Verdes, all of Calif.; Yee Kong Ng, Tai Po, The Hong Kong Special Administrative Region of the People's Republic of China; Elsie Y. Leung, South Pasadena, Calif.

[73] Assignee: Index Systems, Inc., British, Virgin Islands (Br.)

[21] Appl. No.: 08/916,618

[22] Filed: Aug. 22, 1997

Related U.S. Application Data

[60] Provisional application No. 60/025,218, Aug. 23, 1996.

[51] Int. Cl.[7] ............................................. H04N 5/76
[52] U.S. Cl. ............................................. 386/83; 386/95
[58] Field of Search ........................... 386/46, 83, 95; 348/906; H04N 5/76

[56] References Cited

U.S. PATENT DOCUMENTS 5,479,268  12/1995  Young et al. ........................ 386/83
5,488,409  1/1996  Yuen et al. ........................... 386/83

*Primary Examiner*—Huy Nguyen
*Attorney, Agent, or Firm*—Christie, Parker & Hale, LLP

[57] ABSTRACT

A method for recording on video tape and indexing programs carried by a television signal. The title of some, but not all, of the programs is embedded real time in the television signal. A video tape cassette is loaded in a VCR for recording. A data file corresponding to a plurality of television program listings is stored in memory. The data file includes the channel and start time of each program listing, and the title if available. The program listings are displayed on a video monitor. One of the displayed program listings is selected for recording. The data corresponding to the program listing selected for recording is transferred from the data file to a VCR recording stack so the VCR records the program represented by the program listing selected for recording. A directory of programs recorded on the video tape, including program titles and tape locations, is created. If the title of the program being recorded is embedded real time in the television signal, it is added to the directory as the program title. If the title of the program being recorded is not embedded real time in the television signal, the title from the data file corresponding to the program listing selected for recording is added to the directory as the program title. The tape location of the video tape in the VCR at the beginning of the recording of the program represented by the program listing selected for recording is measured and added to the directory.

2 Claims, 4 Drawing Sheets

METHOD OF ADDING TITLES TO A DIRECTORY OF TELEVISION PROGRAMS RECORDED ON A VIDEO TAPE

CROSS REFERENCE TO RELATED APPLICATION

This application claims the benefit of the filing date of provisional Application No. 60/025,218, filed Aug. 23, 1996, the disclosure of which is incorporated herein by reference.

BACKGROUND OF THE INVENTION

This invention relates to enhancements to the operation of video cassette recorders (VCRs). Pending patent applications "Enhancing Operations of Video Tape Cassette Players," application No. 08/673,747, filed Jun. 26, 1996, (attorney docket 29428) and "Method and Apparatus for Displaying Television Programs and Related Text", application No. 08/475,395, filed Jun. 7, 1995, (attorney docket 27971) are hereby incorporated herein by reference in their entirety.

When television programs are recorded on a video tape, it is desirable to include title information of the television programs in a directory accessible by the VCR. This title information is then easily recoverable from the directory for display to a viewer. The viewer can see what television programs are included on a particular video tape because the directory stores the relevant information.

Program titles for the directory are obtained Extended Data Services (EXS) data (EIA-608) broadcast by television stations in line 21, field 2, of the vertical blanking interval (VBI) of the television signal or pre-loaded data stored in memory of the VCR as part of an electronic program guide (EPG) such as disclosed in the above referenced attorney docket 27971. These program titles are inserted into the directory at the time of recording.

SUMMARY OF THE INVENTION

The invention concerns a method for recording on video tape and indexing programs carried by a television signal. The title of some, but not all, of the programs is embedded real time in the television signal. A video tape cassette is loaded in a VCR for recording. A data file corresponding to a plurality of television program listings is stored in memory. The data file includes the channel and start time of each program listing, and the title if available. The program listings are displayed on a video monitor. One of the displayed program listings is selected for recording. The data corresponding to the program listing selected for recording is transferred from the data file to a VCR recording stack so the VCR records the program represented by the program listing selected for recording. A directory of programs recorded on the video tape, including program titles and tape locations, is created. If the title of the program being recorded is embedded real time in the television signal, it is added to the directory as the program title. If the title of the program being recorded is not embedded real time in the television signal, the title from the data file corresponding to the program listing selected for recording is added to the directory as the program title. The tape location of the video tape in the VCR at the beginning of the recording of the program represented by the program listing selected for recording is measured and added to the directory.

Further, according to the invention, a video tape is loaded in the VCR for playback. The directory of the loaded video tape, created in the above described way, is displayed for selection of a program for playback. Then, the video tape is transported to the tape location at the beginning of the recorded program represented by the program listing selected for playback.

BRIEF DESCRIPTION OF THE DRAWINGS

The features of a specific embodiment of the best mode contemplated of carrying out the invention are illustrated in the drawings in which.

DETAILED DESCRIPTION OF A SPECIFIC EMBODIMENT

Figure 1:
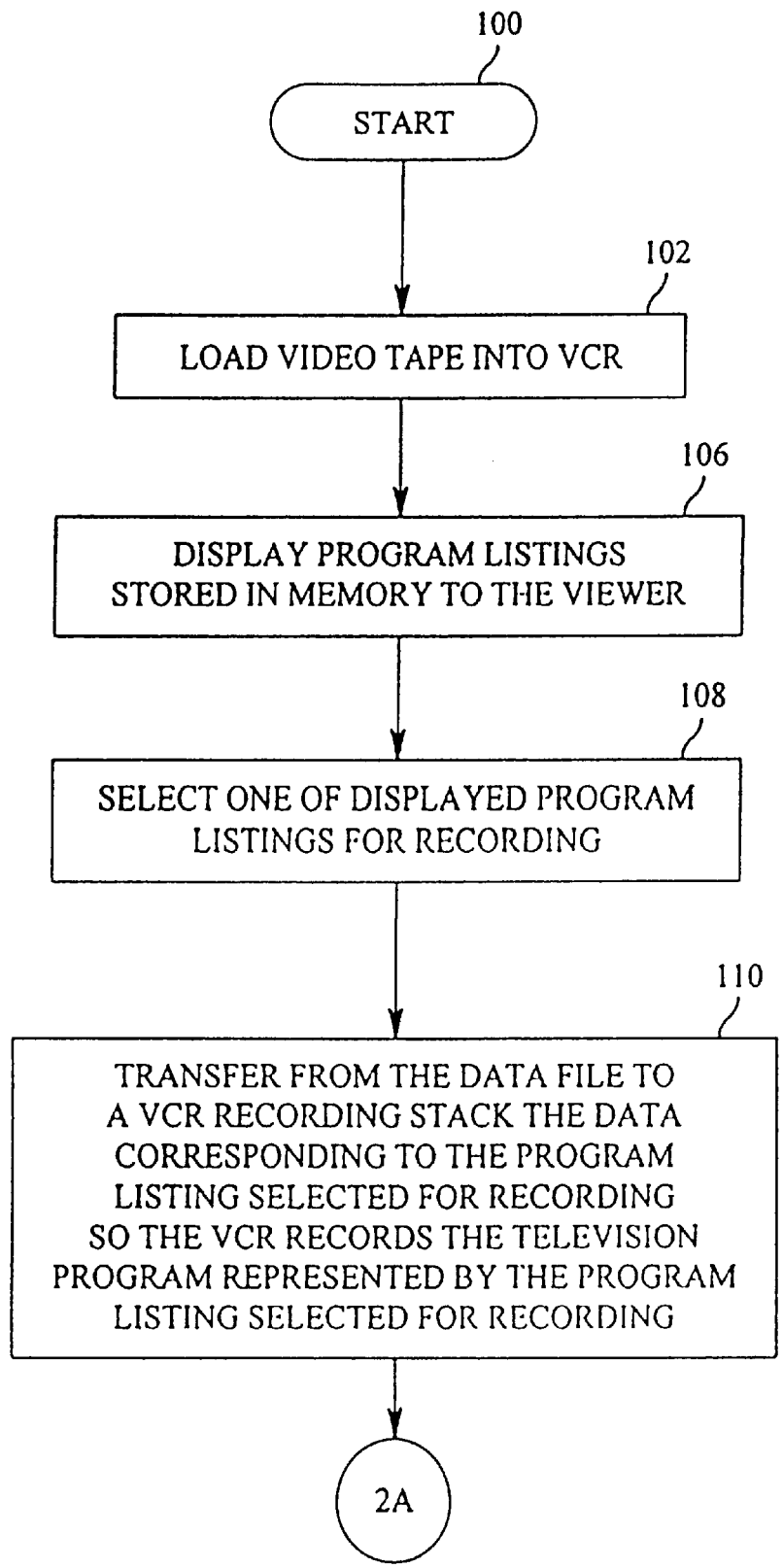
FIGS. 1 TO 4 are flow diagrams illustrating the steps employed to practice the invention.

In the present invention, the television program is carried by a television signal and the titles of some, but not all, of the television programs are embedded real time in the television signal. An EPG data file containing the television program listings is stored in memory. The stored EPG data includes the titles, channels, and start times of the television programs, which are downloaded from the VBI of the television signal at an earlier time and stored in a RAM in the VCR. Referring to FIG. 1, after Start Step 100, the method for recording and indexing television programs being recorded on a video tape commences with the Step 102 of loading a video tape cassette into a VCR for recording a television program. The program listings are then displayed to the viewer at Step 106. At Step 108, one of the displayed program listings is selected by the viewer by a cursor for recording. Next, the EPG data corresponding to the selected program listing or part of such data is transferred at Step 110 from the EPG data file to a VCR recording stack so the VCR records the television program represented by the selected program listing. To conserve memory space, it is advantageous to store only time and channel data in the stack and to retrieve the title data from the EPG data file only when needed. Processing continues on FIG. 2 via connector 2A.

Figure 2:
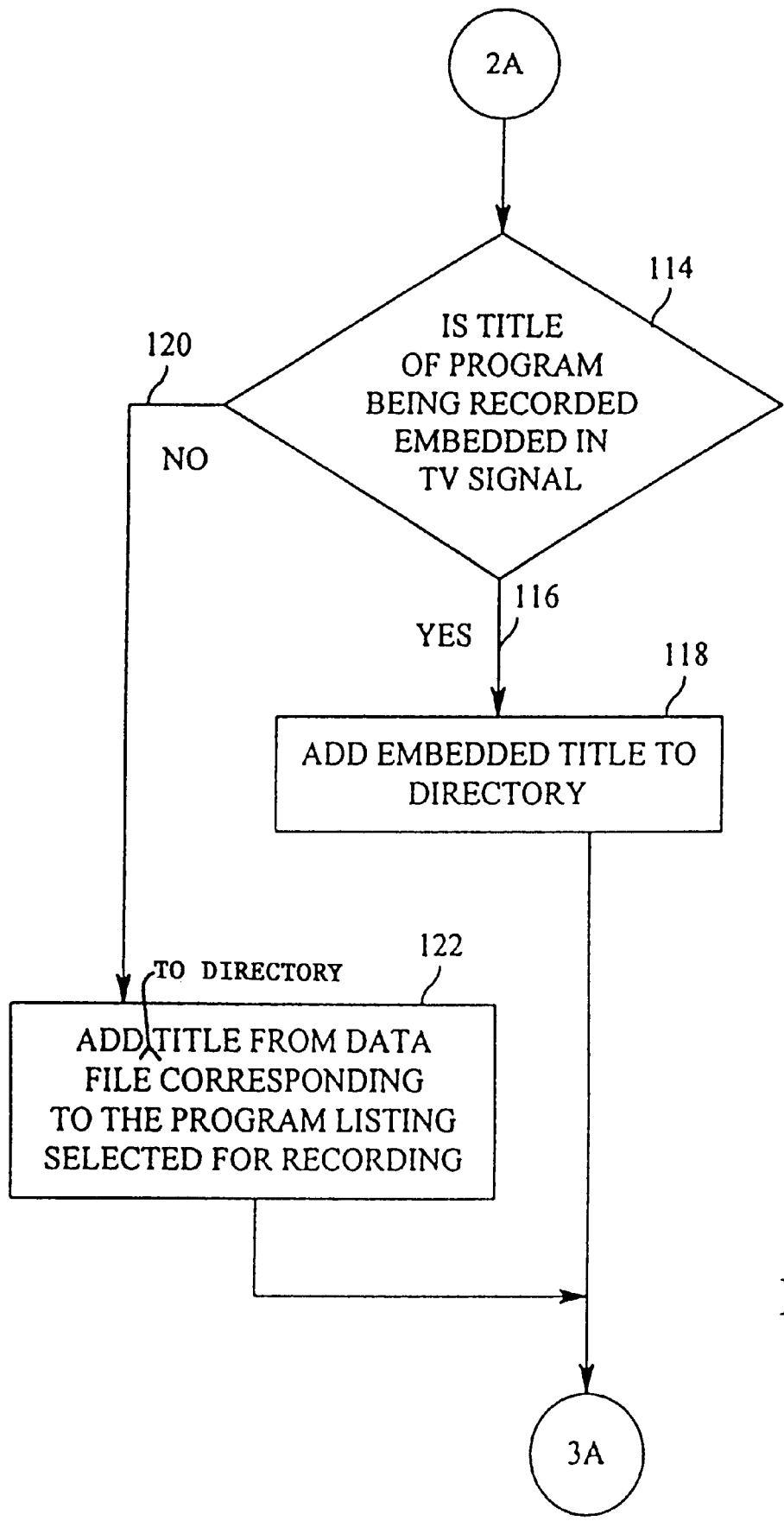

A directory of programs recorded on the video tape is created in a RAM in the VCR as described in the above referenced attorney docket 29428. The directory includes information on the program titles and tape locations where the programs are recorded on the video tape. This could be the same as or different from the RAM that stores the EPG data file. Referring now to FIG. 2, at Step 114, it is determined if the title of the program being recorded is embedded real-time in the television signal, e.g. as XDS data. If the title is embedded in the signal, Yes path 116 is taken to Step 118. At this step, after recording has been completed the embedded title is added to the directory as the program title. In this case, it is not necessary to retrieve the title data from the EPG data file. As a result, less data processing effort and time are required to create the directory entry for the program being recorded. If the title is not embedded in the signal, No path 120 is taken to Step 122. At this step, the title from the EPG data file corresponding to the program listing selected for recording is added to the directory as the program title. This requires data processing effort and time. Processing continues on FIG. 3 via connector 3A.

Figure 3:
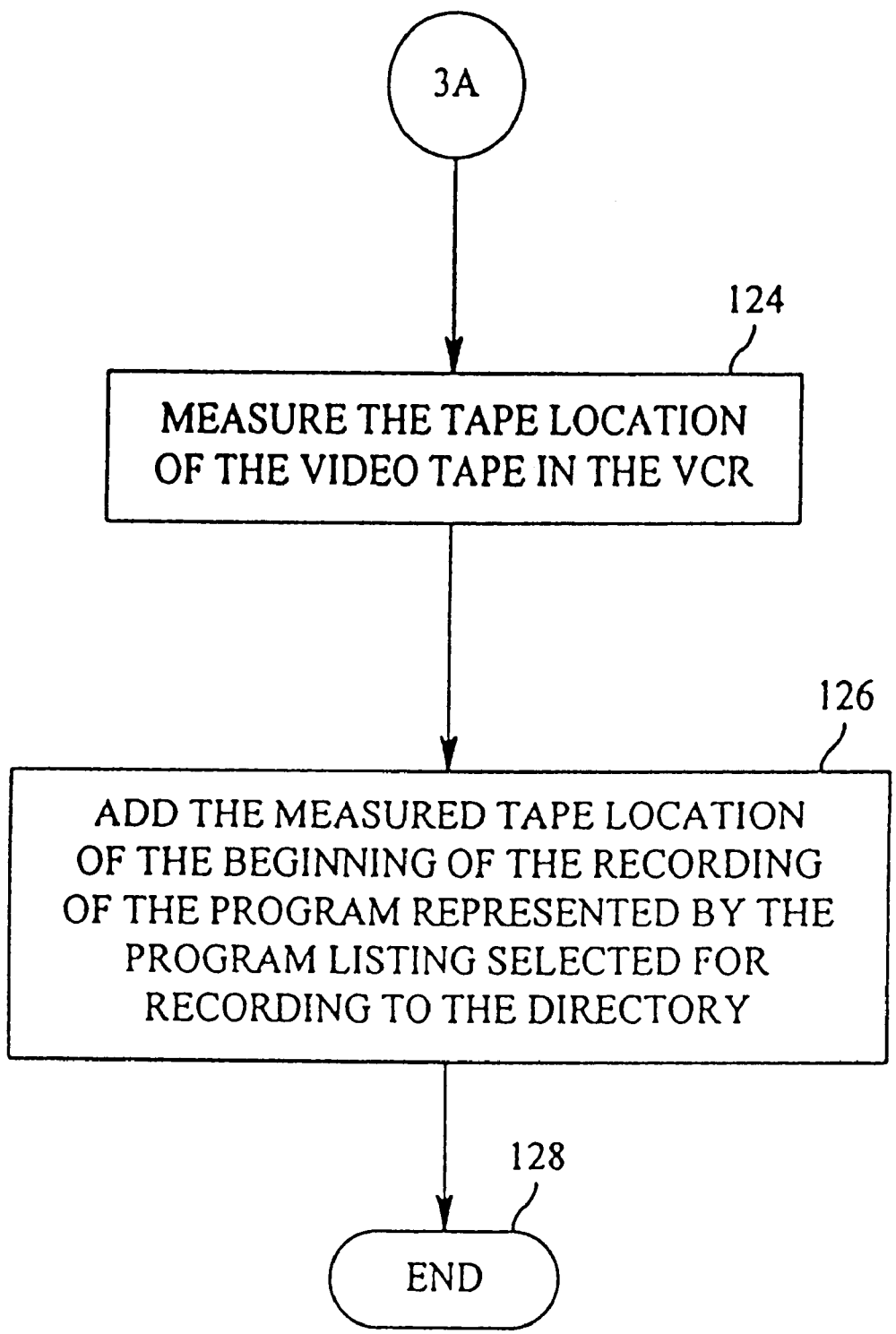

At Step 124 on FIG. 3, the beginning and ending locations of the recorded program on the video tape in the VCR are measured. Although shown in the diagrams after Steps 114, 116, and 122, this step actually is performed while the program is being recorded. At Step 126, the measured tape location of the beginning of the recording of the program represented by the program listing selected for recording is added to the directory. This step could be performed before or after Steps 114, 116, and 122. The recording process is completed at End Step 128.

Figure 4:
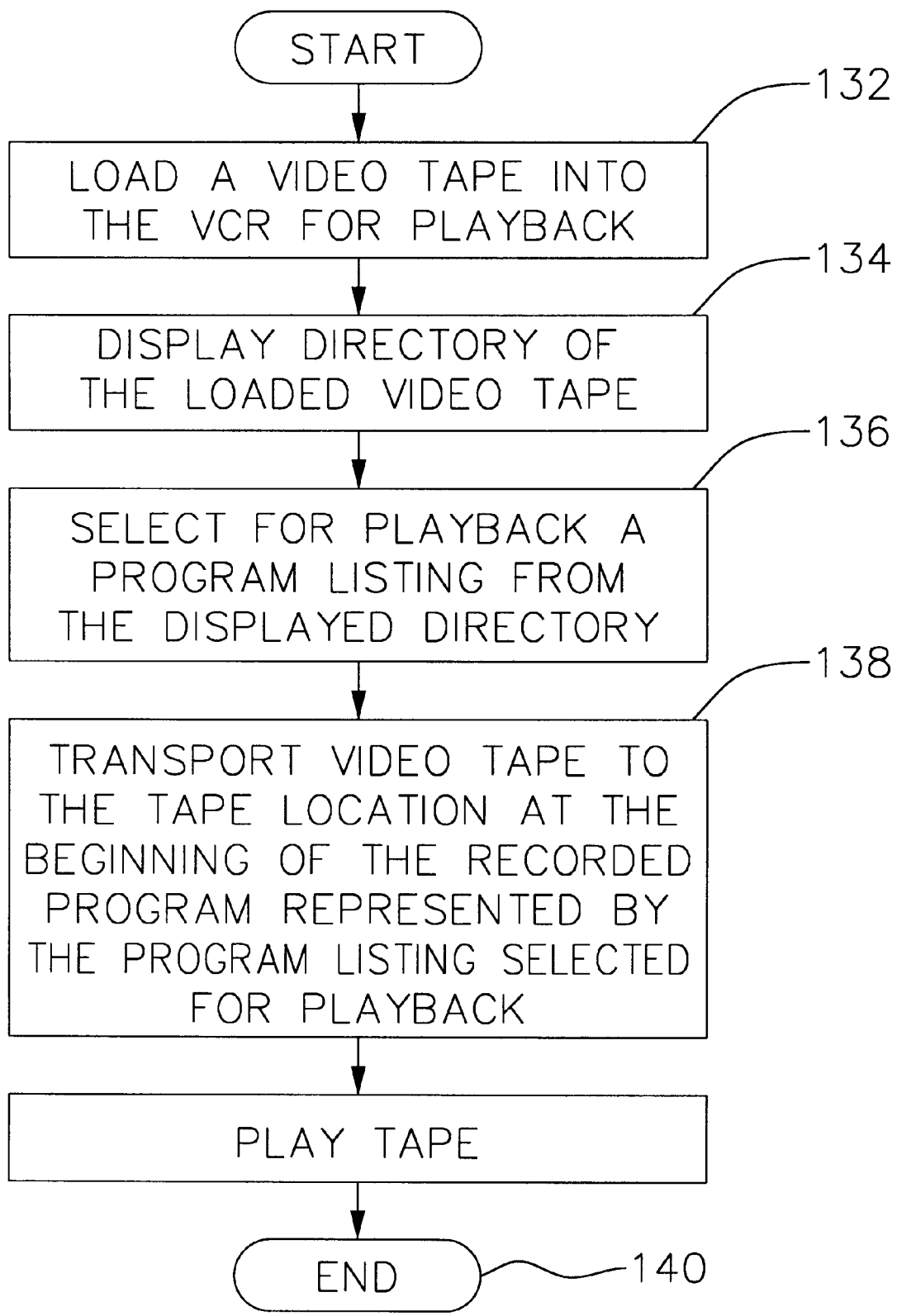

FIG. 4 is a flow chart of the steps for playing a video tape which has been recorded and indexed by the method of FIGS. 1–3. After Start Step 130, a video tape is loaded into the VCR for playback at Step 132. Next, at Step 134 the directory of the loaded video tape is displayed to the viewer. The viewer selects a program listing for playback from the displayed directory at Step 136. The video tape is then transported at Step 138 to the tape location at the beginning of the recorded program represented by the program listing selected for playback. Playback processing ends at End Step 140.

When both live program titles and pre-loaded titles are available, the live broadcast data should take precedence over the pre-loaded titles. For programs without program title information, a channel-date-time stamp is inserted automatically.

What is claimed is:

1. A method for recording on video tape and indexing programs carried by a television signal, the title of some, but not all, of the programs being embedded real time in the television signal, the method comprising the steps of:

loading a video tape cassette in a VCR for recording;

storing in memory a data file corresponding to a plurality of television program listings, the data file including the title, channel, and start time of each program listing;

displaying the program listings stored in memory;

selecting one of the displayed program listings for recording;

transferring from the data file to a VCR recording stack the data corresponding to the program listing selected for recording so the VCR records the program represented by the program listing selected for recording;

creating a directory of programs recorded on the video tape, the directory including program titles and tape locations;

determining if the title of each program being recorded is embedded real time in the television signal;

if the title of the program being recorded is embedded real time in the television signal, adding to the directory as the program title the embedded title;

if the title of the program being recorded is not embedded real time in the television signal, adding to the directory as the program title the title from the data file corresponding to the program listing selected for recording;

measuring the tape location of the video tape in the VCR; and adding to the directory the measured tape location at the beginning of the recording of the program represented by the program listing selected for recording.

2. The method of claim 1, additionally comprising the steps of:

loading a video tape in the VCR for playback;

displaying the directory of the loaded video tape;

selecting for playback a program listing from the displayed directory; and transporting the video tape to the tape location at the beginning of the recorded program represented by the program listing selected for playback.

* * * * *